Nov. 10, 1936.　　　L. T. MURPHY　　　2,060,685
PULP SEPARATING SYSTEM
Filed Aug. 31, 1934　　　2 Sheets-Sheet 1

Inventor
Loyd T. Murphy
By Vernon E. Hodges
his Attorney

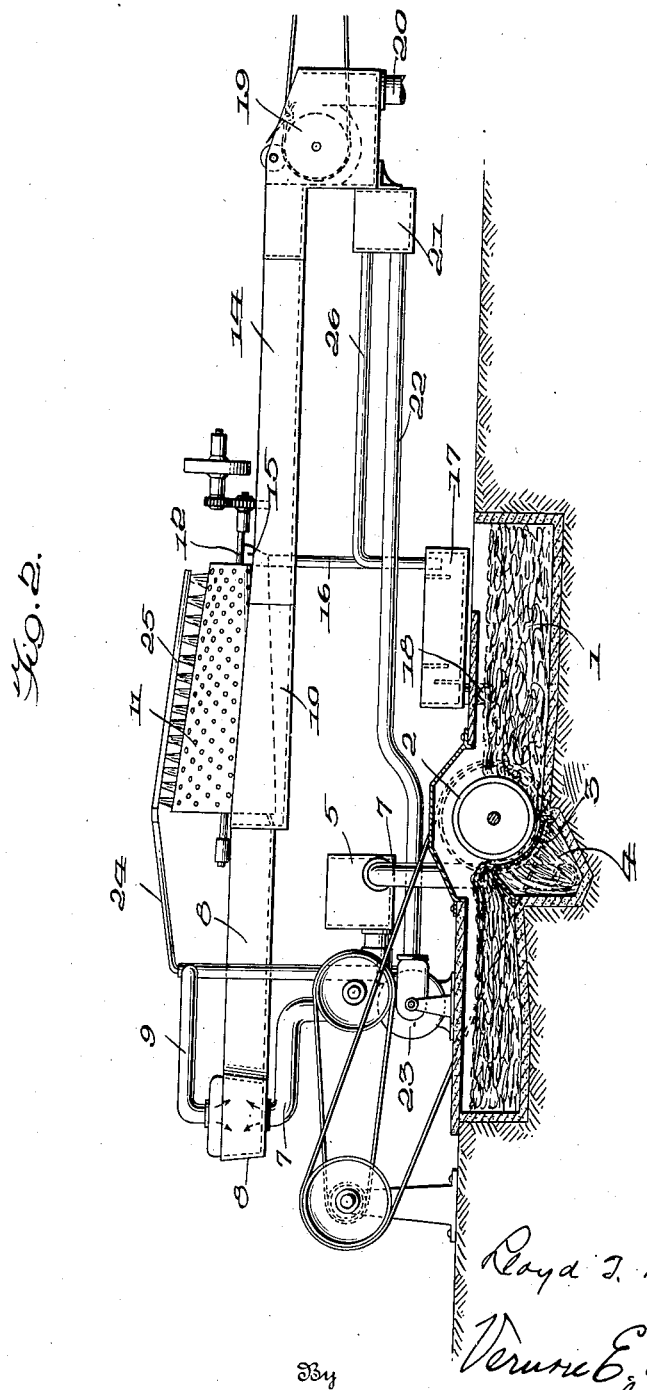

Patented Nov. 10, 1936

2,060,685

UNITED STATES PATENT OFFICE 2,060,685

PULP SEPARATING SYSTEM

Lloyd T. Murphy, Chattanooga, Tenn.

Application August 31, 1934, Serial No. 742,306

4 Claims. (Cl. 92—20)

My invention relates to separating unpulped waste paper stock, paraffin, matches, sticks, rubber and other foreign matter from properly pulped waste paper stock in connection with the settling trough of a continuous waste paper pulping beater system in a continuous manner.

It has been proposed heretofore to use another type of separating system wherein a flat screen having a perforated flat bottom stationary of the common known diaphragm vibrating type, the diaphragm being vibrated by cams, plunger, etc., causing a suction under the perforated bottom in the screen, causing the pulped paper stock to pass through the perforations in the bottom of the said screen and flowing therefrom to the settling trough, entering a thickener, or from the screen direct to the thickener, the screen having a drag going slowly over the perforated bottom in the screen, which drags the rubber bands, unpulped paper stock, corks, matches, sticks, etc., out of the end of the flat screen into the beater.

The object of my invention is to properly clean the stock without using as much floor space as was required heretofore with the usual flat type separator or screen, and at the same time to operate the system with less power than was required heretofore.

I accomplish these objects by the use of a cylinder type perforated screen, or other rotary screen device instead of the usual flat screen.

In my invention, I take my waste paper stock from the settling trough or system into a revolving foraminated cylinder or extractor into which the material is fed at one end and from which the fine pulped paper stock escapes through the perforations by gravity. The unpulped waste paper stock, matches, sticks, rubber, cork, paraffin, etc., are discharged out of the opposite end of the cylinder into a hopper from which they are directed to a vat or tank, the unpulped paper stock returning to the beater and the matches, sticks, rubber and other foreign matter being skimmed off automatically or otherwise. The fine properly pulped paper stock, after going through the foraminated cylinder enters the thickener which takes out the surplus water, letting the thicker stock go to the stuff chest or tank to be reground or finished for paper making.

A preferred embodiment of my invention is hereinafter described and is illustrated in the accompanying drawings, in which:

Fig. 2 is a diagrammatic side elevation thereof, parts being in section.

Figure 1:
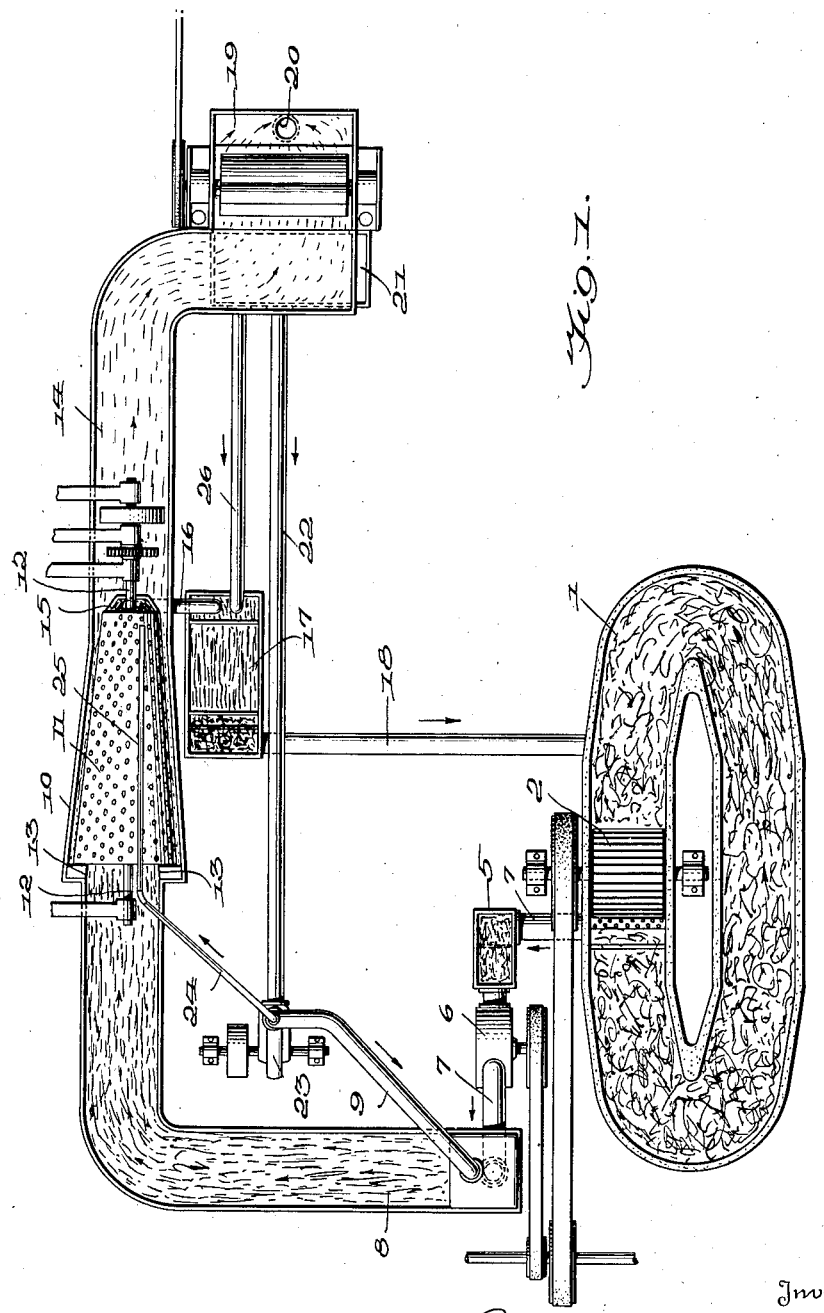
Fig. 1 is a diagrammatic top plan view of the system.

The preferred embodiment of my invention as illustrated in the drawings, comprises an ordinary beating tub 1, in which the old papers are beaten by the action of a beater roll 2 into pulp form, and the fine pulp, etc., passes through a perforated backfall 3, into a chamber 4. The pulp is withdrawn from the chamber 4, into a flow box 5. A stock pump 6, pumps the pulp through the pipe 7, into the bottom of a settling trough 8. Water is forced into the top of the settling trough through a pipe 9, to dilute the fiber and to settle the sand, grit, and other heavy matter, while the pulp passes through the settling trough.

Disposed in an enlarged portion 10, of the settling trough, is a foraminated cylinder or extractor 11, mounted as by the usual spiders on a shaft 12, which is adapted to be driven by power. Deflectors 13 are arranged to direct the stock from the settling trough 8, into the open end of the cylinder or extractor 11, and in passing into the cylinder or extractor 11 the rotation thereof, together with gravity will cause the fine pulp to go through the perforations into the discharge portion of the settling trough, designated 14.

A hopper 15 is arranged at the discharge end of the cylinder or extractor 11, and receives therefrom the unpulped paper stock, matches, paraffin, rubber, etc., and directs the same through a pipe 16, to a separating vat or settling trough 17, where the paraffin, matches, rubber, and other floating foreign materials are separated from the paper stock, and the large particles of unpulped paper are returned through a pipe 18, to the beater 1, to be properly pulped and recirculated through the system until the paper pulp is fine enough to pass through the perforations in the separator 11. After the fine pulp stock leaves the separator 11, and enters the settling trough portion 14, it flows through the same into a thickener 19, of usual or desired construction, which thickener takes out the surplus water and permits the finished clean paper stock to flow through a discharge pipe 20, to be completely finished for paper making.

The excess water taken out of the paper stock by the thickener 19, enters a reservoir 21, and the largest part of this water flows through a pipe 22, to a pump 23, which supplies the pipe 9 for the settling trough 8, and also supplies a pipe 24, leading to a shower pipe 25. The remainder of the water from the reservoir 21, passes through an overflow white water pipe 26, to the separating vat or settling trough 17, thence to the beater 1.

The shower pipe 25, directs a shower of water over the cylinder or extractor 11, to keep the perforations clean at all times, thereby securing the greatest capacity.

My improved system enables me to make a much better quality of paper or board from old paper, such as waste paper stock, which is commonly used today for making the heavier weight of paper and paperboard. By using my improved cleaning and separating system, the fine stock or pulp is separated from the coarse particles of unpulped paper and foreign substances, and the fine pulp stock entering the jordans for regrinding and finishing for the paper-making machine, is much more uniform than heretofore and it takes less power to finish treating the fibers, which has been proven by actual use of this system in operation.

A greatly improved quality of paperboard with a greater production is manufactured at much less cost. It requires less coal per ton of board manufactured due to the saving in horse-power, besides the increased production per day and the improved quality of board, all of which proves the great value and advantage of using this invention.

At the same time my system is a considerable improvement over the flat-type screens heretofore used, because it can be installed in much less floor space and makes fully as good, if not better, quality of board and cleans the stock fully as good as the flat screen.

I claim:

1. In a paper stock separating and cleaning system, the combination of a settling trough, a hollow truncated-conical foraminated extractor arranged lengthwise in an intermediate portion of said settling trough with inlet and discharge portions of the settling trough extending in different directions from the ends of said extractor, said extractor having the larger end thereof arranged toward the inlet end portion of the settling trough, means adjacent said larger end of the extractor for directing pulp from said inlet end portion of the settling trough directly into said larger end of the extractor, said extractor being adapted to have screened pulp passing through the walls thereof into the discharge portion of the settling trough, and discharge means for receiving unscreened pulp from the smaller end of the extractor.

2. In a paper stock separating and cleaning system, the combination of a settling trough, a hollow truncated-conical foraminated extractor arranged lengthwise in an intermediate portion of said settling trough with inlet and discharge portions of the settling trough extending in opposite directions from the ends of said extractor, said extractor having the larger end thereof arranged toward the inlet end portion of the settling trough, means adjacent the larger end of the extractor for directing pulp from said inlet end portion of the settling trough directly into said larger end of the extractor, the intermediate portion of said settling trough being arranged to receive screened pulp directly through the walls of the extractor and direct the same into the discharge portion of the settling trough, and discharge means for receiving unscreened pulp from the smaller end of the extractor.

3. In a paper stock separating and cleaning system, the combination of a beater, a settling trough arranged to receive stock from the beater, an extractor arranged in an intermediate portion of said settling trough with portions of the settling trough extending in different directions from said extractor, said extractor being arranged to discharge screened pulp into the discharge portion of the settling trough, a settling vat, means for directing unscreened material from the extractor to the settling vat, means for returning material from the vat to the beater, and a thickener associated with the discharge portion of the settling trough to receive the pulp therefrom.

4. In a paper stock separating and cleaning system, the combination of a beater, an elongated settling trough arranged to receive paper stock from the beater, a hollow truncated-conical foraminated extractor arranged lengthwise in an intermediate portion of said settling trough with inlet and discharge portions of the settling trough extending in opposite directions from the larger and smaller ends, respectively, of said extractor, means for directing pulp from the inlet end portion of the settling trough into said extractor for screening said pulp, said extractor being arranged to discharge screened pulp through the walls thereof into the discharge portion of the settling trough, a thickener arranged to receive the pulp from the discharge portion of the settling trough, a settling vat, means for directing the unscreened pulp from the smaller end of the extractor to the settling vat for the removal of foreign materials therefrom, and means for directing the pulp from the vat to the beater for recirculation through the system.

LLOYD T. MURPHY.